(12) United States Patent
Hamada et al.

(10) Patent No.: US 7,272,356 B1
(45) Date of Patent: Sep. 18, 2007

(54) INFORMATION DELIVERY SYSTEM

(75) Inventors: Junichi Hamada, Tokyo (JP);
Kiyoyasu Maruyama, Tokyo (JP);
Tomonori Ohashi, Tokyo (JP);
Kyosuke Yoshimoto, Tokyo (JP);
Norishige Emoto, Tokyo (JP); Tetsuya Sigeeda, Tokyo (JP); Yoichi Masubuchi, Tokyo (JP); Takanori Murakami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 614 days.

(21) Appl. No.: 10/381,706

(22) PCT Filed: Oct. 19, 2000

(86) PCT No.: PCT/JP00/07302

§ 371 (c)(1),
(2), (4) Date: Mar. 27, 2003

(87) PCT Pub. No.: WO02/33861

PCT Pub. Date: Apr. 25, 2002

(51) Int. Cl.
*H04H 1/00* (2006.01)
(52) U.S. Cl. ............ 455/3.01; 455/3.03; 455/431
(58) Field of Classification Search .......... 455/450, 455/451, 452.1, 466, 452.2, 41.2, 41.3, 556.1, 455/557, 3.01, 3.03, 431; 370/338
See application file for complete search history.

(56) References Cited

U.S. PATENT DOCUMENTS

| | | | | |
|---|---|---|---|---|
| 2,008,280 A | * | 7/1935 | Hopkins | ........... 455/3.06 |
| 5,854,591 A | * | 12/1998 | Atkinson | ........... 725/76 |
| 6,135,396 A | * | 10/2000 | Whitfield et al. | ....... 246/182 R |
| 6,519,511 B1 | * | 2/2003 | Oberschachtsiek et al. | .... 701/1 |
| 6,597,764 B1 | * | 7/2003 | Haze | ........ 379/88.01 |
| 6,700,602 B1 | * | 3/2004 | Blair | ........... 348/61 |
| 2002/0164148 A1 | * | 11/2002 | Kim et al. | ....... 386/46 |

FOREIGN PATENT DOCUMENTS

| | | |
|---|---|---|
| EP | 0557058 A1 | 8/1993 |
| EP | 0 813 341 A2 | 12/1997 |
| JP | 60-169263 A | 9/1985 |
| JP | 5-128156 A | 5/1993 |
| JP | 7-264572 A | 10/1995 |
| JP | 2569025 B2 | 10/1996 |
| JP | 9-172417 A | 6/1997 |
| JP | 9-331512 A | 12/1997 |
| WO | WO-00/52857 A2 | 9/2000 |

\* cited by examiner

*Primary Examiner*—Nay Maung
*Assistant Examiner*—Dominic E. Rego
(74) *Attorney, Agent, or Firm*—Birch, Stewart, Kolasch, & Birch, LLP

(57) ABSTRACT

In an information distribution system for outputting information using an information output unit that is distributed from an information distribution unit, it is an object of the present invention to obtain an information distribution system capable of readily changing information in a short time to be outputted from the information output unit. In order to achieve this object, an information distribution system includes an output unit (10) for outputting information to be provided to a user, a distribution unit (11) for distributing a piece of information to the output unit (10) as the information to be provided, the piece of information being selected from several pieces of information prepared in advance, and an input unit (12) connected to the distribution unit (11) through a communication line and inputting a control signal to the distribution unit (11) through the communication line, the control signal selecting the information to be provided from the several pieces of information.

8 Claims, 6 Drawing Sheets

INFORMATION DELIVERY SYSTEM

This application is the national phase under 35 U.S.C. § 371 of PCT International Application No. PCT/JP00/07302 which has an International filing date of Oct. 19, 2000, which designated the United States of America.

TECHNICAL FIELD

The present invention relates to an information distribution system for outputting information using an information output unit distributed from an information distribution unit. More particularly, it relates to an information distribution system utilized for providing information to passengers in a passenger car of a train, for example.

BACKGROUND ART

In a railway station, a bus stop or in an airport, for example, various kinds of information have been provided to users using posters or announcement in many cases. With the development in computer systems and video systems in recent years, however, it has been allowed to provide these kinds of information to the users as video information and audio information.

FIG. 6 is a block diagram illustrating the structure of an information display system in the background art (see Japanese Patent Publication No. 2569025). With reference to FIG. 6, the background-art information display system has a control unit 900, and a display device 941 and a ticket vending machine 942 with display device each controlled by the control unit 900. The control unit 900 includes an image transmission line 952, a data transmission line 951, a communication controller 911, a control calculator 901, a control communication line 912, a keyboard 902, a monitor 903, a fixed disk 904, a printer 905, controllers 921, 923, an image memory 925, a video tape recorder 922, a video disk 924, a video signal converter 926, and a signal switching device 931. The control unit 900 is placed at each railway station. The ticket vending machine 942 with display device is placed at a ticket counter in a railway station. The display device 941 is located in a passenger car of a train or at a platform of a station.

Next, operations of the background-art information display system given in FIG. 6 will be described. Various types of images to be provided to the users are stored in advance in each of the video tape recorder 922, the video disk 924 and the image memory 925. On the basis of control instructions inputted by an administrator of this information display system (information provider) using the keyboard 902, the control calculator 901 controls operations of the devices such as the controllers 921, 923 and the signal switching device 931. In response to channel switching operation of the signal switching device 931, the images stored in each of the video tape recorder 922, the video disk 924 and the image memory 925, or images transmitted from outside through the image transmission line 952 are thereby displayed on the display device 941 and the ticket vending machine 942 with display device and provided to the users.

According to the background-art information display system given in FIG. 6, however, only the information provider is allowed to change information in the control unit 900 displayed on the display device 941 and the ticket vending machine 942 with display device. Therefore, even in the case such as emergency where change to the information provided to the users should be immediately reflected, the information provider should change information on receipt of notification from the users, for example. Change to the information requires control of the signal switching device 931 using the keyboard 902 and replacement of the devices such as the video tape recorder 922 in the controller 900, taking long time to reflect change to the information.

DESCRIPTION OF THE INVENTION

It is an object of the present invention to obtain an information distribution system solving the foregoing problems, and capable of readily changing information in a short time to be displayed on a display device, for example.

A first aspect of the information distribution system of the present invention is an information distribution system including an output unit for outputting information to be provided to a user, a distribution unit for distributing a piece of information to the output unit as the information to be provided, the piece of information being selected from several pieces of information prepared in advance, and an input unit connected to the distribution unit through a communication line and inputting a control signal to the distribution unit through the communication line, the control signal selecting the information to be provided from the several pieces of information.

According to the first aspect of the information distribution system of the present invention, the information to be provided can be changed in the distribution unit by remote control by the input unit connected to the distribution unit through the communication line.

In a second aspect of the information distribution system of the present invention, in the first aspect, the input unit is operable by the user.

According to the second aspect of the information distribution system of the present invention, the user operates the input unit. Therefore, the user is allowed to immediately gain necessary information.

In a third aspect of the information distribution system of the present invention, in the first aspect, the input unit includes an information input section allowing input of other information different from the several pieces of information, and the other information is transmitted from the information input section to the distribution unit through the communication line.

According to the third aspect of the information distribution system of the present invention, the other information is inputted to the information input section. Therefore, the information prepared in the distribution unit can be updated by remote control.

In a fourth aspect of the information distribution system of the present invention, in the first aspect, the distribution unit includes an output section for outputting state information indicating normal/abnormal state in the distribution unit, and the input unit includes a state information display for displaying the state information transmitted from the output section through the communication line.

According to the fourth aspect of the information distribution system of the present invention, a failure in the distribution unit can be checked by the state information display of the input unit.

In a fifth aspect of the information distribution system of the present invention, in the fourth aspect, the communication line is telephone.

According to the fifth aspect of the information distribution system of the present invention, the information distribution system can be constructed with a simple structure using existing telephone.

In a sixth aspect of the information distribution system of the present invention, in the fifth aspect, the state information is inputted to the input unit as a ringing pattern of a bell of the telephone.

According to the sixth aspect of the information distribution system of the present invention, communication costs can be reduced.

In a seventh aspect of the information distribution system of the present invention, in the first aspect, the communication line is telephone.

According to the seventh aspect of the information distribution system of the present invention, the information distribution system can be constructed with a simple structure using existing telephone.

In an eighth aspect of the information distribution system of the present invention, in the seventh aspect, the control signal is inputted to the distribution unit as a ringing pattern of a bell of the telephone.

According to the eighth aspect of the information distribution system of the present invention, communication costs can be reduced.

In a ninth aspect of the information distribution system of the present invention, in the eighth aspect, the distribution unit includes a microphone for picking up a ringing tone of the bell, and an analysis section for analyzing the ringing pattern of the bell picked up by the microphone.

According to the ninth aspect of the information distribution system of the present invention, an existing telephone can be used as the input unit. As a result, it is allowed to reduce costs of the system as a whole.

These and other objects, features, aspects and advantages of the present invention will become more apparent from the following detailed description of the present invention when taken in conjunction with the accompanying drawings.

BEST MODE FOR CARRYING OUT THE INVENTION

Giving the case as an example where information is to be provided to passengers in a train, the information distribution system of the present invention will be described below.

First Embodiment

Figure 1:
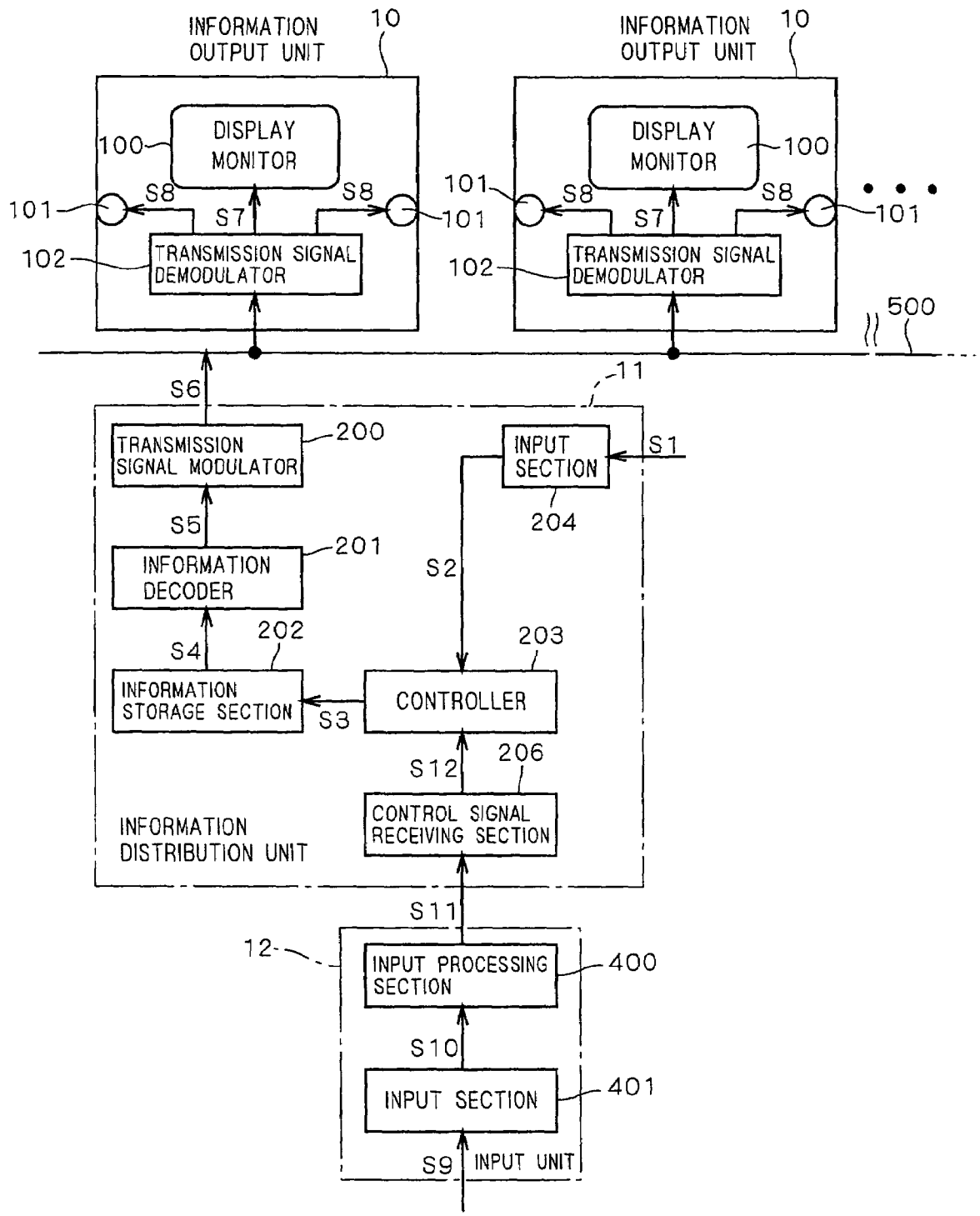
FIG. 1 is a block diagram illustrating the structure of an information distribution system according to a first embodiment of the present invention.

FIG. 1 is a block diagram illustrating the structure of the information distribution system according to the first embodiment of the present invention. With reference to FIG. 1, the information distribution system according to the first embodiment has a plurality of information output units 10, an information distribution unit 11 operable by an information provider for distributing information to the plurality of information output units 10 to be provided to the passengers as users, an input unit 12 connected to the information distribution unit 11 through a wired or wireless communication line, and an information transmission line 500 for connecting the information output units 10 and the information distribution unit 11. The information output unit 10 is located in a passenger car of a train, for example. The information distribution unit 11 is placed in a driver's cab of the train, for example. Further, the input unit 12 is placed in the passenger car of the train or at each railway station, or alternatively, at a main command room for overseeing and controlling train service. In the following description, the input unit 12 is placed in the passenger car of the train by way of example.

The input unit 12, operable by the users (including a train crew), includes an input section 401 allowing input of necessary information using an arbitrary input device, and an input processing section 400 connected to an output of the input section 401 for inputting a signal S10 from the input section 401 and transmitting a control signal S11 to the information distribution unit 11.

The information distribution unit 11 includes a control signal receiving section 206 for receiving the control signal S11 transmitted from the input processing section 400 and analyzing the contents thereof, an information storage section 202 for storing several pieces of video and audio information (referred to herein as information A and information B) to be displayed and reproduced by the information output unit 10, and an information decoder 201 connected to an output of the information storage section 202 for decoding a signal S4 inputted thereto from the information storage section 202. The control signal receiving section 206 of the information distribution unit 11 and the input processing section 400 of the input unit 12 are connected to each other through a wired or wireless communication line.

The information distribution unit 11 further includes an input section 204 operable by the information provider, and a controller 203 connected to each output of the input section 204 and the control signal receiving section 206. The information distribution unit 11 still includes a transmission signal modulator 200 connected to an output of the information decoder 201 and to the information transmission line 500 for converting a signal S5 inputted thereto from the information decoder 201 into a transmission signal S6 of a predetermined format and transmitting the signal S6 to the information transmission line 500. Operations of the transmission signal modulator 200, the information decoder 201, the information storage section 202, and the control signal receiving section 206 are respectively controlled by the controller 203.

The information output unit 10 includes a transmission signal demodulator 102 connected to the information transmission line 500 for demodulating the transmission signal S6 transmitted from the information distribution unit 11 through the information transmission line 500 into an video signal S7 and an audio signal S8 and outputting the signals S7 and S8. The information output unit 10 further includes a display monitor 100 and a speaker 101 each connected to an output of the transmission signal demodulator 102 for providing video information and audio information to the users on the basis of the video signal S7 and the audio signal S8 inputted from the transmission signal demodulator 102, respectively.

Assuming that image and sound with respect to the information A are displayed on the display monitor 100 and reproduced through the speaker 101, respectively, operations of the information distribution system according to the first embodiment given in FIG. 1 will be described below. In this case, a signal S1 indicating that the information A should be provided to the users is inputted by the information provider to the input section 204 of the information distribution unit 11. A signal S2 is inputted from the input section 204 to the controller 203. Here, the signal S2 indicates that the information A should be provided to the users. A signal S3 is inputted from the controller 203 to the information storage section 202. Here, the signal S3 indicates an instruction to output the information A. Further, the signal S4 is inputted from the information storage section 202 to the information decoder 201. Here, the signal S4 is a video and audio signal with respect to the information A. The signal S5 is inputted from the information decoder 201 to the transmission signal modulator 200. Here, the signal S5 is a video and audio signal with respect to the information A decoded by the information decoder 201.

The transmission signal S6 is inputted from the transmission signal modulator 200 to the transmission signal demodulator 102 of the information output unit 10 through the information transmission line 500. Here, the signal S6 is a video and audio signal with respect to the information A modulated by the transmission signal modulator 200. The video signal S7 is inputted to the display monitor 100 from the transmission signal demodulator 102. Here, the video signal S7 is a video signal with respect to the information A demodulated by the transmission signal demodulator 102. The image with respect to the information A is thereby displayed on the display monitor 100. Further, the audio signal S8 is inputted to the speaker 101 from the transmission signal demodulator 102. Here, the audio signal S8 is an audio signal with respect to the information A demodulated by the transmission signal demodulator 102. The sound with respect to the information A is thereby reproduced through the speaker 101.

In a situation where the image and sound with respect to the information A are displayed on the display monitor 100 and reproduced through the speaker 101, respectively, operations will be described below in the case where the users wish to gain the information B different from the information A. The user inputs a signal S9 indicating that the information B is required to the input section 401 of the input unit 12. On receipt of the signal S9, the input section 401 outputs the signal S10 indicating that the information to be provided should be switched to the information B. The input processing section 400 receives the signal S10 inputted thereto from the input section 401, converts the signal S10 into the transmissible control signal S11 of a predetermined format indicating that the information to be provided should be switched to the information B, and transmits the signal S11.

The control signal receiving section 206 of the information distribution unit 11 receives the control signal S111 from the input processing section 400 through a communication line. Then the control signal receiving section 206 analyzes the contents of the received control signal S11 and determines that "the control signal S11 is a signal indicating that the information to be provided should be switched to the information B". Thereafter the control signal receiving section 206 outputs the result of determination as a signal S12. The controller 203 receives the signal S12 inputted thereto from the control signal receiving section 206. On the basis of the description of the signal S12, the controller 203 outputs the signal S3. Here, the signal S3 indicates an instruction to output the information B.

The information storage section 202 receives the signal S3 inputted thereto from the controller 203 and outputs the signal S4 on the basis of the description of the signal S3. The information decoder 201 receives the signal S4 inputted thereto from the information storage section 202, decodes the signal S4, and outputs the same as the signal S5. The transmission signal modulator 200 receives the signal S5 inputted thereto from the information decoder 201, modulates the signal S5, and outputs the same as the transmission signal S6. Here, the transmission signals S4 through S6 are each video and audio signal with respect to the information B.

The transmission signal demodulator 102 of the information output unit 10 receives the transmission signal S6 inputted thereto from the transmission signal modulator 200 through the information transmission line 500, demodulates the transmission signal S6 into the video signal S7 and the audio signal S8, and outputs the signals S7 and S8. Here, the video signal S7 and the audio signal S8 are video and audio signals, respectively, each with respect to the information B. The video display monitor 100 and the speaker 101 receive the video signal S7 and the audio signal S8 respectively inputted thereto from the transmission signal demodulator 102. The image with respect to the information B is thereby displayed on the display monitor 100 and the sound with respect to the information B is reproduced through the speaker 101.

As described above, the information distribution system of the first embodiment has the input unit 12 connected to the information distribution unit 11 through a wired or wireless communication line. The information distribution unit 11 is remotely controlled by the input unit 12, to change the information to be provided to the users at the information output unit 10. As a result, it is allowed to realize the information distribution system capable of readily changing the information to be provided to the users in a short time.

Second Embodiment

Figure 2:
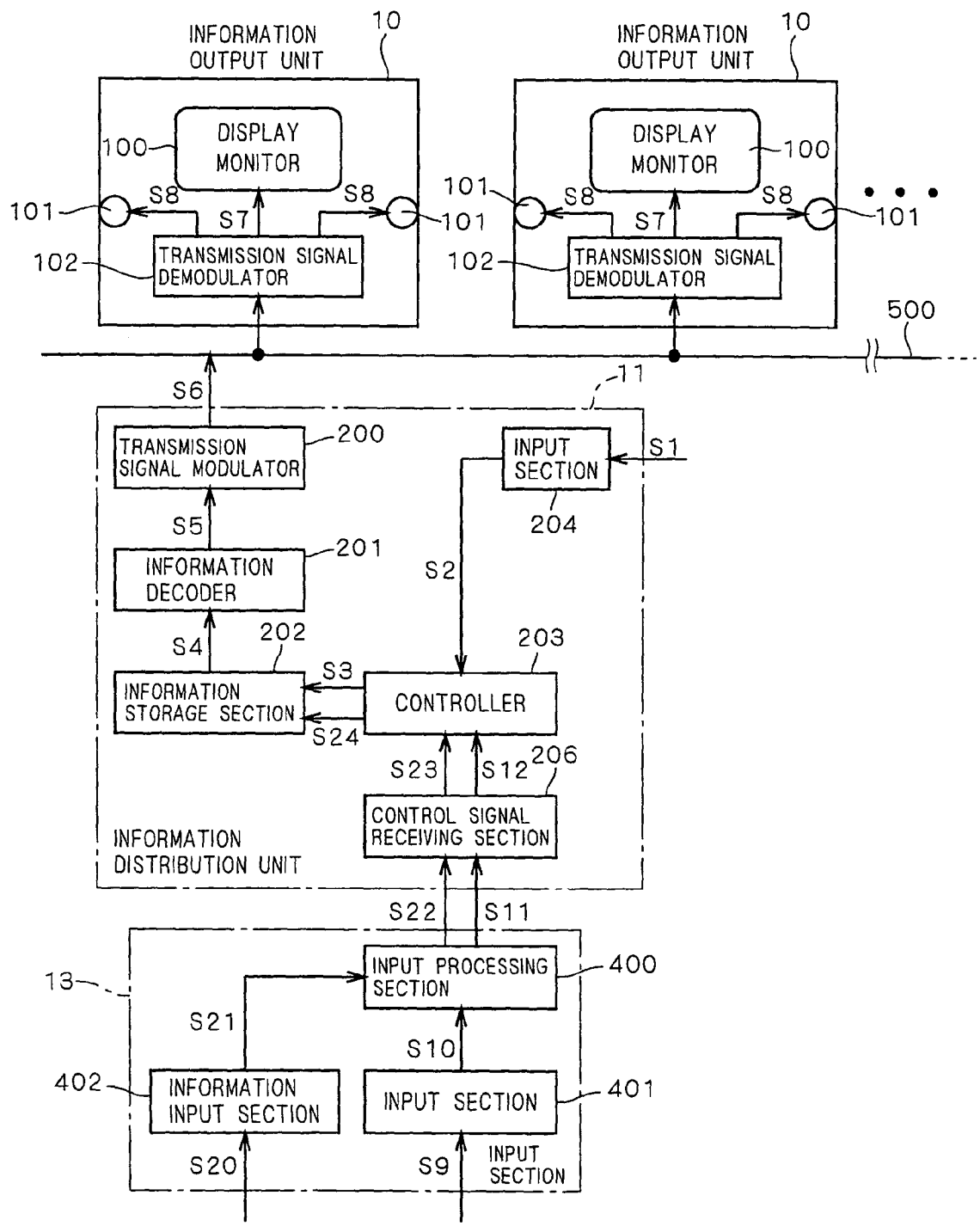
FIG. 2 is a block diagram illustrating the structure of an information distribution system according to a second embodiment of the present invention.

FIG. 2 is a block diagram illustrating the structure of the information distribution system according to the second embodiment of the present invention. An input unit 13 includes the input section 401 that is also a constituent of the foregoing first embodiment. The input unit 13 further includes an information input section 402 operable by the users for inputting arbitrary video and audio information, and the input processing section 400 connected to each output of the input section 401 and the information input section 402. The configuration of the information distribution system according to the second embodiment is the same in the other respects as those of the information distribution system given in FIG. 1 according to the foregoing first embodiment.

Operations of the information distribution system given in FIG. 2 according to the second embodiment will be described below with particular emphasis on the difference from the information distribution system according to the foregoing first embodiment. The user inputs arbitrary video and audio information S20 to the information input section 402. On the basis of the video and audio information S20 inputted thereto, the information input section 402 generates a video and audio data signal S21 and outputs the signal S21. The input processing section 400 receives the video and audio data signal S21 inputted thereto from the information input section 402, converts the signal S21 into a transmissible data signal S22 of a predetermined format, and transmits the signal S22.

The control signal receiving section 206 of the information distribution unit 11 receives the data signal S22 from the input processing section 400 through a communication line. Then the control signal receiving section 206 converts the received data signal S22 into video and audio data signal S23, and outputs the date S23. The controller 203 receives the video and audio data signal S23 inputted thereto from the control signal receiving section 206, and transmits the same as a video audio data signal S24 to the information storage section 202. The information storage section 202 stores the video and audio data signal S24 transmitted from the controller 203. Following the same operations as in the foregoing first embodiment, the video and audio information stored in the information storage section 202 with respect to the video and audio data signal S24 is displayed on the display monitor 100 of the information output unit 10 and reproduced through the speaker 101, and then provided to the users.

As described above, video and audio information is inputted to the information input section 402 of the input unit 13. The inputted video and audio information is then transmitted to the information distribution unit 11, thereby updating the contents stored in the information storage section 202 of the information distribution unit 11. That is, the contents stored in the information storage section 202 can be updated by remote control by the input unit 13. As a result, it is allowed to readily update the information to be provided to the users by the information output unit 10 in a short time.

Third Embodiment

Figure 3:
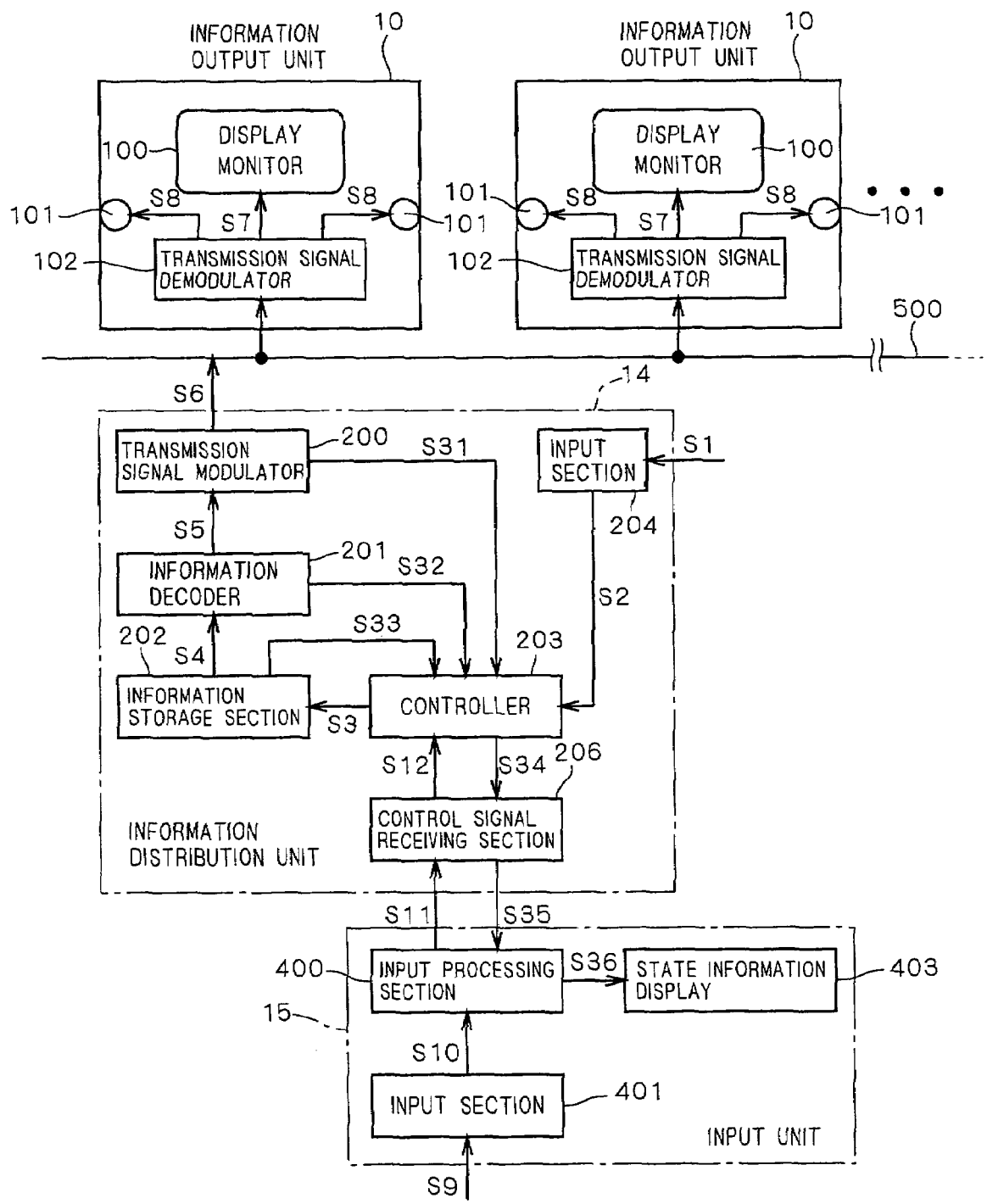
FIG. 3 is a block diagram illustrating the structure of an information distribution system according to a third embodiment of the present invention.

FIG. 3 is a block diagram illustrating the structure of the information distribution system according to the third embodiment of the present invention. The transmission signal modulator 200, the information decoder 201 and the information storage section 202 of an information distribution unit 14 output state information signals S31, S32 and S33, respectively indicating that the transmission signal modulator 200, the information decoder 201 and the information storage section 202 are in a normal state or in an abnormal state. The state information signals S31, S32 and S33 are inputted to the controller 203. An input unit 15 includes an state information display 403 connected to an output of the input processing section 400. The configuration of the information distribution system according to the third embodiment is the same in the other respects as that of the information distribution system given in FIG. 1 according to the foregoing first embodiment.

Operations of the information distribution system given in FIG. 3 according to the third embodiment will be described below with particular emphasis on the difference from the information distribution system according to the foregoing first embodiment. The transmission signal modulator 200, the information decoder 201 and the information storage section 202 continuously monitor their states and output the state information signals S31, S32 and S32, respectively indicating that the transmission signal modulator 200, the information decoder 201 and the information storage section 202 are in a normal state or in an abnormal state. The controller 203 receives the state information signals S31, S32 and S33 respectively inputted thereto from the transmission signal modulator 200, the information decoder 201 and the information storage section 202. Further, the controller 203 continuously monitors whether the controller 203 itself is in a normal state or in an abnormal state. Then the controller 203 generates and outputs a state information signal S34 indicating the states of the transmission signal modulator 200, the information decoder 201, the information storage section 202 and the controller 203 itself. That is, the controller 203 serves as an output section for outputting the state information signal S34 indicating normal/abnormal state in the information distribution unit 14.

The control signal receiving section 206 receives the state information signal S34 inputted thereto from the controller 203, converts the signal S34 into a transmissible state information signal S35 of a predetermined format, and transmits the signal S35. The input processing section 400 of the input unit 15 receives the state information signal S35 from the control signal receiving section 206 through a communication line, and outputs the same as a state information signal S36. The state information display 403 receives the state information signal S36 inputted thereto from the input processing section 400, and displays whether the transmission signal modulator 200, the information decoder 201, the information storage section 202 and the controller 203 are each in a normal state or in an abnormal state. The information displayed on the state information display 403 is provided to the users.

In the description so far, the invention according to the third embodiment has been applied to the information distribution system according to the foregoing first embodiment given in FIG. 1 as a basis. Alternatively, the invention of the third embodiment may be applied to the information distribution system according to the foregoing second embodiment given in FIG. 2 as a basis.

As described above, according to the information distribution system of the third embodiment, it is displayed on the state information display 403 of the input unit 15 whether the transmission signal modulator 200, the information decoder 201, the information storage section 202 and the controller 203 of the information distribution unit 14 are each in a normal state or in an abnormal state. Therefore, abnormality in the information distribution unit 14 can be immediately discovered, thus resulting in a more stable management of the system.

Fourth Embodiment

Figure 4:
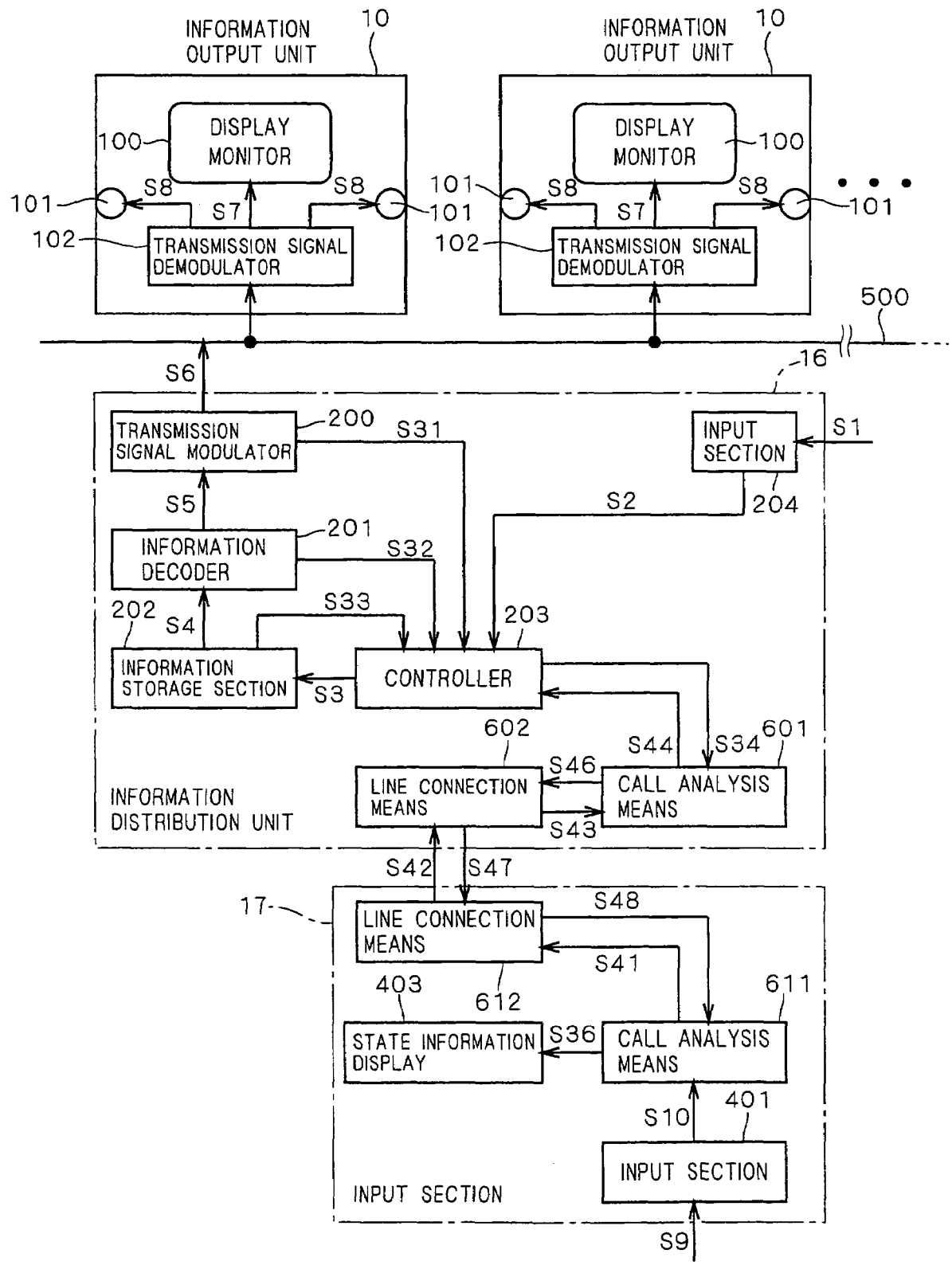
FIG. 4 is a block diagram illustrating the structure of an information distribution system according to a fourth embodiment of the present invention.

FIG. 4 is a block diagram illustrating the structure of the information distribution system according to the fourth embodiment of the present invention. An input unit 17 includes call analysis means 611 connected to an output of the input section 401, line connection means 612 connected to the call analysis means 611 allowing mutual input/output to and from the call analysis means 611, and the state information display 403 connected to an output of the call analysis means 611. Similar to the foregoing second embodiment, the input unit 17 may further include the information input section 402.

An information distribution unit 16 includes the transmission signal modulator 200, the information decoder 201, the information storage section 202, the controller 203 and the input section 204, each of which is also a constituent of the foregoing third embodiment. The information distribution unit 16 further includes line connection means 602 connected to the line connection means 612 by telephone, and call analysis means 601 connected to the line connection means 602 and the controller 203 allowing mutual input/ output to and from the line connection means 602 and the controller 203, respectively.

Operations of the information distribution system according to the fourth embodiment given in FIG. 4 will be described below. Similar to the foregoing first embodiment, the operations will be described in a situation where the image and sound with respect to the information A are displayed on the display monitor 100 and reproduced through the speaker 101 and the users wish to gain the information B different from the information A. The operations of the information output unit 10 for outputting the image and sound with respect to the information A are the same as those in the foregoing first embodiment and therefore, the description thereof is omitted here.

The user inputs the signal S9 to the input section 401 of the input unit 17 indicating that the information B is required. On receipt of the signal S9, the input section 401 outputs the signal S10 indicating that the information to be provided to the users should be switched to the information B. The call analysis means 611 receives the signal S10 inputted thereto from the input section 401, converts the signal S10 into a signal S41 indicating that a telephone bell should be caused to ring a predetermined number of times (here, three times), and outputs the signal S41. The line connection means 612 receives the signal S41 inputted thereto from the call analysis means 611. Then the line connection means 612 is connected to the line connection means 602 of the information distribution unit 16 by telephone, to cause a telephone bell to ring three times. It means that a control signal S42 indicating that a telephone bell should be caused to ring three times is inputted from the line connection means 612 to the line connection means 602 by telephone.

The line connection means 602 of the information distribution unit 16 electrically detects the fact that a telephone bell rang three times and outputs the fact as a signal S43. The call analysis means 601 receives the signal S43 inputted thereto from the line connection means 602. Then the call analysis means 601 analyzes the contents of the signal S43 and determines that "the control signal S43 is a signal indicating that the information to be provided should be switched to the information B". Thereafter the call analysis means 601 outputs the result of determination as a signal S44 indicating that the information to be provided should be switched to the information B. The controller 203 receives the signal S44 inputted thereto from the call analysis means 601. On the basis of the description of the signal S44, the controller 203 outputs the signal S3 indicating an instruction to output the information B.

Thereafter, following the same operations as those of the foregoing first embodiment, the video and audio signals with respect to the information B are read from the information storage section 202 and transmitted to the information output unit 10. The image with respect to the information B is thereby displayed on the display monitor 100 and the sound with respect to the information B is reproduced through the speaker 101.

Similar to the foregoing third embodiment, in the information distribution system of the fourth embodiment, the transmission signal modulator 200, the information decoder 201 and the information storage section 202 also continuously monitor their states and output the state information signals S31, S32 and S33, respectively indicating that the transmission signal modulator 200, the information decoder 201 and the information storage section 202 are in a normal state or in an abnormal state. The controller 203 receives the state information signals S31, S32 and S33 respectively inputted thereto from the transmission signal modulator 200, the information decoder 201 and the information storage section 202. Further, the controller 203 continuously monitors whether the controller 203 itself is in a normal state or in an abnormal state. Then the controller 203 generates and outputs the state information signal S34 indicating the states of the transmission signal modulator 200, the information decoder 201, the information storage section 202 and the controller 203 itself.

The call analysis means 601 receives the state information signal S34 inputted thereto from the controller 203. Then the call analysis means 601 analyzes the contents of the state information signal S34 and outputs a signal S46 having the contents that vary according to the contents of the state information signal. S34 (namely, breakdown of devices such as transmission signal modulator 200). For example, the signal S46 may be a signal indicating that "a telephone bell should be caused to ring five times first, and then ring three times thirty seconds thereafter." The line connection means 602 receives the signal S46 inputted thereto from the call analysis means 601. The line connection means 602 is connected to the line connection means 612 of the input unit 17 by telephone. A telephone bell is thereby caused to ring five times first, and then ring three times thirty seconds thereafter. It means that a control signal S47 indicating that "a telephone bell should be caused to ring five times first, and then ring three times thirty seconds thereafter" is inputted from the line connection means 602 to the line connection means 612 by telephone.

The line connection means 612 of the input unit 17 electrically detects the fact that a telephone bell rang five times first and then rang three times thirty seconds thereafter, and outputs the fact as a signal S48. The call analysis means 611 receives the signal S48 inputted thereto from the line connection means 612. Then the call analysis means 611 analyzes the contents of the signal S48, generate the state information signal S36 corresponding to the state information signal S34, and outputs the same. The state information display 403 receives the state information signal S36 inputted thereto from the call analysis means 611, and displays whether the transmission signal modulator 200, the information decoder 201, the information storage section 202 and the controller 203 are each in a normal state or in an abnormal state. The information displayed on the state information display 403 is provided to the users.

As described above, according to the information distribution system of the fourth embodiment, the information distribution unit 16 and the input unit 17 are connected by telephone as a communication line therebetween. Therefore, the information distribution systems of the foregoing first, second and third embodiments can be constructed by applying existing equipment of a simple structure.

Further, on the basis of a ringing pattern of a telephone bell, the control signals S42 and S47 are transmitted to and from the line connection means 602 of the information distribution unit 16 and the line connection means 612 of the input unit 17. As a result, it is allowed to reduce communication costs.

Fifth Embodiment

Figure 5:
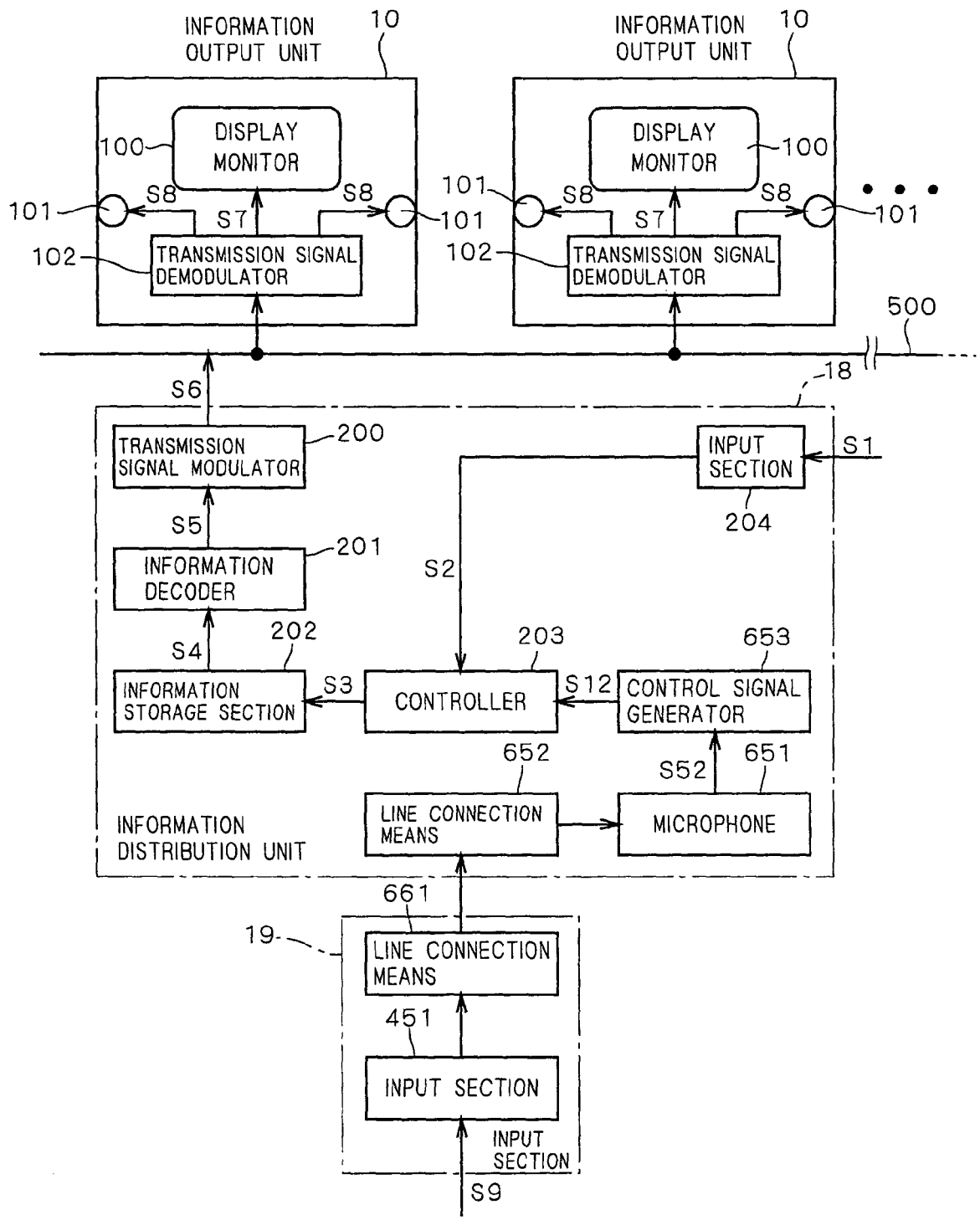
FIG. 5 is a block diagram illustrating the structure of an information distribution system according to a fifth embodiment of the present invention.
Figure 6:
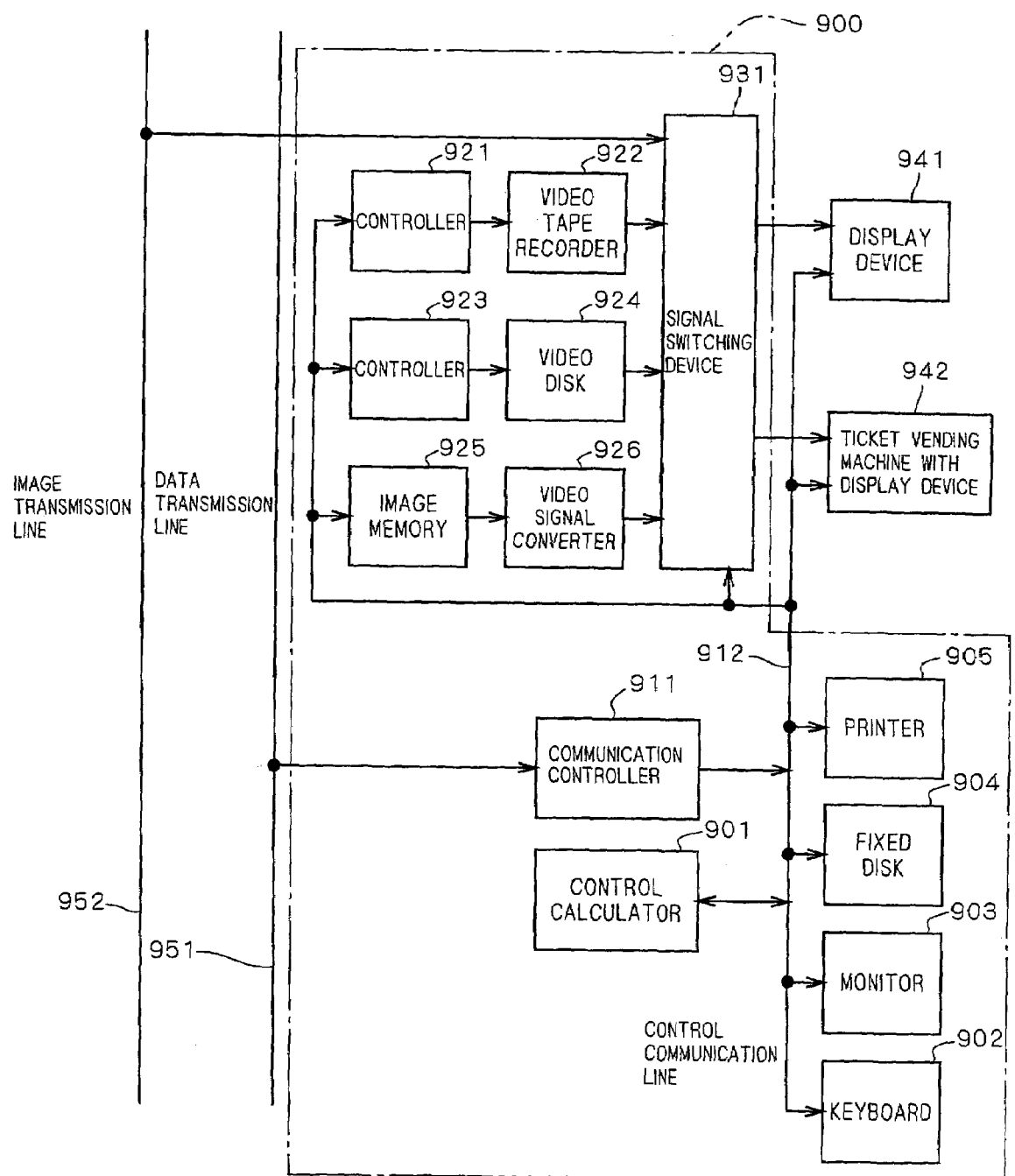
FIG. 6 is a block diagram illustrating the structure of the information distribution system in the background art.

FIG. 5 is a block diagram illustrating the structure of the information distribution system according to the fifth embodiment of the present invention. An input unit 19 is an existing telephone including an input section 451 operable by the users, and line connection means 661 for connecting the input unit 19 to an information distribution unit 18 by telephone.

The information distribution unit 18 includes the transmission signal modulator 200, the information decoder 201, the information storage section 202, the controller 203 and the input section 204, each of which is also a constituent of the foregoing first embodiment. The information distribution unit 18 further includes line connection means 652 connected to the line connection means 661 by telephone, a microphone 651 for picking up a ringing tone of a telephone from the line connection means 652, and a control signal generator 653 for analyzing the tone picked up by the microphone 651 and converting the same into the control signal S12.

Operations of the information distribution system according to the fifth embodiment given in FIG. 5 will be described below. Similar to the foregoing first embodiment, the operations will be described in a situation where the image and sound with respect to the information A are displayed on the display monitor 100 and reproduced through the speaker 101 and the users wish to gain the information B different from the information A. The operations of the information output unit 10 for outputting the image and sound with respect to the information A are the same as those in the foregoing first embodiment and therefore, the description thereof is omitted here.

The user inputs the signal S9 to the input section 451 of the input unit 19 indicating that the information B is required. More particularly, directions telling that "a telephone bell should be caused to ring three times for switching the information to the information B" are displayed together with a telephone number on the input unit 19. According to these directions, the user logs in to telephone, causes a telephone bell to ring three times, and then logs off telephone. A telephone bell is thereby caused to ring three times at the line connection means 652 of the information distribution unit 18.

The ringing tone of the telephone at the line connection means 652 is picked up by the microphone 651. Next, the microphone 651 outputs a signal S52 indicating that a telephone bell rang three times. The control signal generator 653 receives the signal S52 inputted thereto from the microphone 651. Then the control signal generator 653 analyzes the contents of the signal S52 and determines that "the signal S52 is a signal indicating that the information to be provided should be switched to the information B". Thereafter the control signal generator 653 outputs the signal S12 indicating that the information to be provided should be switched to the information B. The controller 203 receives the control signal S12 inputted thereto from the control signal generator 653. On the basis of the description of the control signal S12, the controller 203 outputs the signal S3 indicating an instruction to output the information B.

Thereafter, following the same operations as those of the foregoing first embodiment, the video and audio signals with respect to the information B are read from the information storage section 202 and transmitted to the information output unit 10. The image with respect to the information B is thereby displayed on the display monitor 100 and the sound with respect to the information B is reproduced through the speaker 101.

As described above, according to the information distribution system of the fifth embodiment, the information distribution unit 18 and the input unit 19 are connected by existing telephone as a communication line therebetween. Further, an existing telephone is used as the input unit 19. As a result, it is allowed to reduce costs of the system as a whole.

While the invention has been shown and described in detail, the foregoing description is in all aspects illustrative and not restrictive. It is therefore understood that numerous modifications and variations can be devised without departing from the scope of the invention.

The invention claimed is:

1. An information distribution system, comprising:
   an output unit for outputting video and/or information to be provided to a user via a display device and at least one speaker;
   a distribution unit for distributing said information to said output unit as said information to be provided, said information being selected from a plurality of information prepared in advance; and
   an input unit connected to said distribution unit through a communication link, said input unit inputting a control signal to said distribution unit through said communication link, said control signal selecting said information to be provided from said plurality of information, wherein
   said output unit is located in a passenger car of a train,
   said distribution unit is placed in a driver's cab of said train, and
   said input unit is placed at a railway station, or alternatively, at a main command room for overseeing and controlling train service.

2. The information distribution system according to claim 1, wherein
   said input unit includes an information input section allowing input of other information different from said plurality of information, and
   said other information is transmitted from said information input section to said distribution unit through said communication link.

3. The information distribution system according to claim 1, wherein
   said distribution unit includes an output section for outputting state information indicating normal/abnormal state in said distribution unit, and
   said input unit includes a state information display for displaying said state information transmitted from said output section through said communication link.

4. The information distribution system according to claim 3, wherein
   said communication link is telephone.

5. The information distribution system according to claim 4, wherein
   said state information is inputted to said input unit as a ringing pattern of a bell of said telephone.

6. The information distribution system according to claim 1, wherein
   said communication link is telephone.

7. The information distribution system according to claim 6, wherein
   said control signal is inputted to said distribution unit as a ringing pattern of a bell of said telephone.

8. The information distribution system according to claim 7, wherein
   said distribution unit includes:
   a microphone for picking up a ringing tone of said bell; and
   an analysis section for analyzing said ringing pattern of said bell picked up by said microphone.

* * * * *